July 13, 1926. 1,592,755
E. BUGATTI
METHOD OF MANUFACTURE OF LIGHT FRONT AXLES FOR MOTOR VEHICLES
Filed Jan. 8, 1925
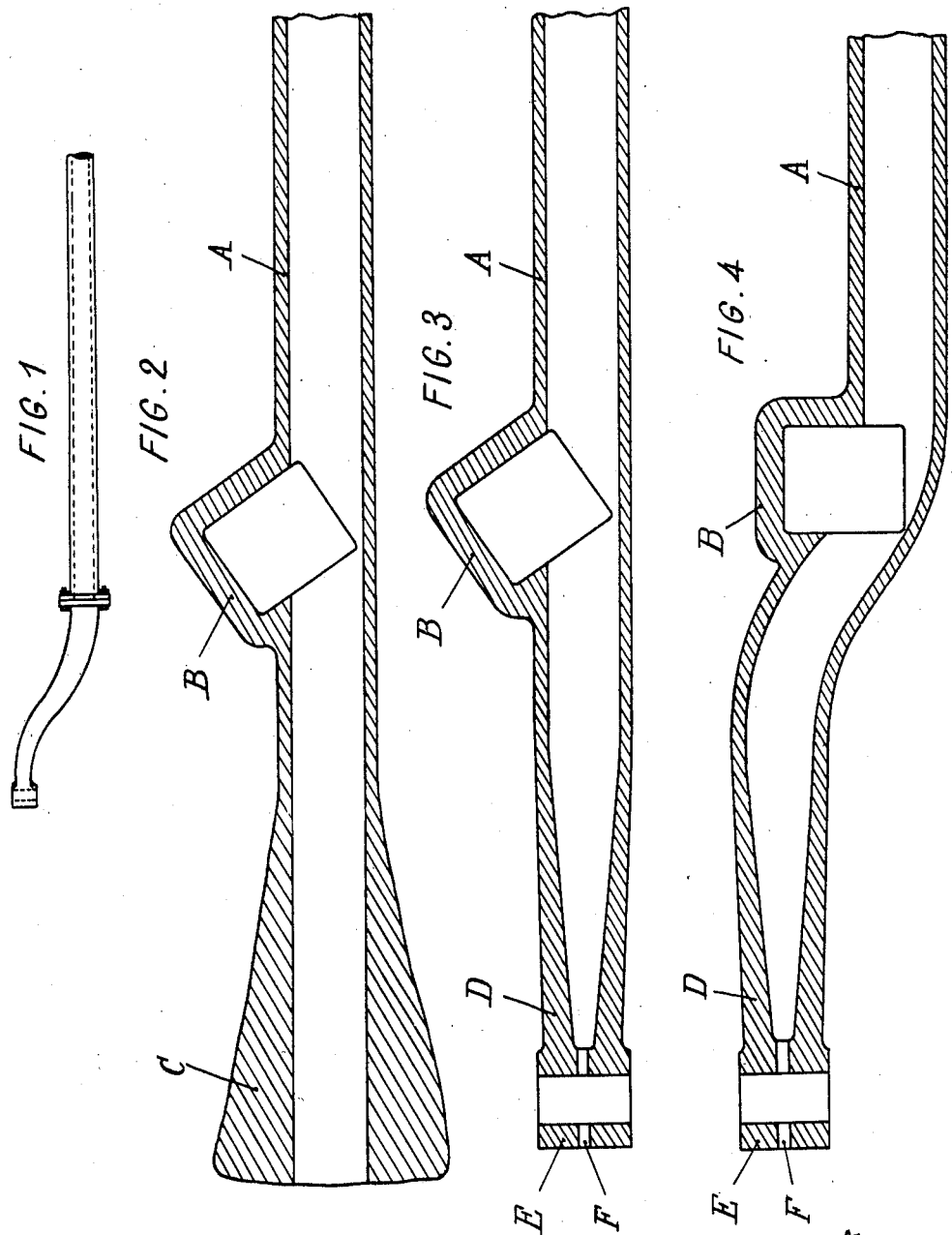

Patented July 13, 1926.

1,592,755

UNITED STATES PATENT OFFICE.

ETTORE BUGATTI, OF MOLSHEIM, FRANCE.

METHOD OF MANUFACTURE OF LIGHT FRONT AXLES FOR MOTOR VEHICLES.

Application filed January 8, 1925, Serial No. 1,266, and in France June 6, 1924.

In order to provide a light construction for vehicle axles, the latter are usually made in three parts which are screwed or bolted together. But this method offers a serious drawback from the fact that the piece is less rigid and substantial.

The present invention relates to the construction of a front axle of round cross section which is made hollow throughout the entire length, the overhung ends being forged after drilling, so as to give to the same a shape which is adapted to withstand flexion as well as torsion.

The following description, with reference to the appended drawings which are given by way of example, sets forth the said invention.

Fig. 1 shows an axle of the usual type.

Figs. 2, 3 and 4 represent the axle according to the invention in three stages of its manufacture.

The axle A, Fig. 2, is forged in a straight piece, leaving at the proper places the bosses B for the insertion of the springs; the ends C are given a much larger cross-section than the middle part. After centering, the axle has formed therein a bore of suitable diameter upon the entire length.

After forming the bore, the ends are forged and reduced in size, Fig. 3, in order to diminish the section of the bore; this latter operation has for its object to give to the part D of the axle the shape of a solid which will withstand flexion as well as torsion, while at the same time providing a portion E of great strength in which the wheel spindle or journal is mounted.

The axle is then turned throughout the whole length to the requisite dimensions.

In a third operation, the said axle is given the form which is shown in Fig. 4, and the bending operation which is performed in the hot state is very simple.

By the said construction, an axle can be produced which consists of homogeneous material; its thickness is uniform and can be gauged or checked at all points; the axle has no weak points and it offers the maximum safety for a minimum weight.

A small aperture F may be provided in the portion E for checking operations which can be performed from time to time, and this will show any cracks or fissures, or the like, which may have been produced after a long use of the axle.

On the other hand, the said axle can be pierced by means of a hollow tool in order to provide a cylindrical test piece for purposes of examination, thus observing any internal flaws.

What I claim is:

1. A method of manufacture of a front axle of light weight and in a single piece for motor vehicles, which consists in forging a steel bar so as to provide a larger cross-section at the ends than at the middle, in piercing the bar throughout its length, in forging the ends of the bar to a shape withstanding both flexion and torsion, in turning the bar throughout its length, and in bending the ends of the bar in the usual manner.

2. A method of manufacture of a front axle of light weight and in one piece for motor vehicles, which consists in forging a solid steel bar in such manner as to provide a larger cross section at the ends and bosses for the subsequent insertion of the vehicle springs, in piercing the bar thus forged throughout its whole length, in restricting the said bar at the ends whereby the latter will be reduced to the general section of the bar and bosses will be formed for the insertion of the axle spindles, in lathe-turning the axle throughout in order to reduce it to the proper dimensions and in bending the ends of the said axle into the usual shape.

3. A method of manufacture of a front axle of light weight and in one piece for motor vehicles, which consists in forging a solid steel bar in such manner as to provide a larger cross section at the ends, in forming two inclined bosses adjacent the ends for the subsequent insertion of the vehicle springs, in piercing the bar thus forged throughout the entire length, in restricting the ends of the bar in order to reduce them to the dimensions of a solid having an equal resistance to flexion and to torsion and to form two bosses for the insertion of the axle spindles, in lathe-turning the axle throughout, in bending the ends of the axle in the usual manner, which operation will also straighten the said bosses adapted for the insertion of the springs.

In testimony whereof I have signed this specification.

ETTORE BUGATTI.